(12) United States Patent
Shamrakov

(10) Patent No.: US 7,533,050 B2
(45) Date of Patent: May 12, 2009

(54) INTEGRATION OF COMPUTER APPLICATIONS AND E-BUSINESS CAPABILITY

(75) Inventor: Anatole Shamrakov, Randwick (AU)

(73) Assignee: International Business Machines Corporation, Armonk, NY (US)

( * ) Notice: Subject to any disclaimer, the term of this patent is extended or adjusted under 35 U.S.C. 154(b) by 1649 days.

(21) Appl. No.: 09/892,147

(22) Filed: Jun. 26, 2001

(65) Prior Publication Data

US 2002/0198800 A1 Dec. 26, 2002

(51) Int. Cl.
*G06Q 40/00* (2006.01)

(52) U.S. Cl. .............................. 705/37; 705/38; 705/36; 705/35

(58) Field of Classification Search ............. 705/35–38, 705/26, 34, 52, 14, 58, 8, 1
See application file for complete search history.

(56) References Cited

U.S. PATENT DOCUMENTS

| | | | |
|---|---|---|---|
| 6,587,838 B1* | 7/2003 | Esposito et al. ............... | 705/26 |
| 6,963,847 B1* | 11/2005 | Kennedy et al. ............... | 705/8 |
| 6,980,962 B1* | 12/2005 | Arganbright et al. .......... | 705/26 |
| 2001/0056405 A1* | 12/2001 | Muyres et al. ................ | 705/52 |
| 2002/0042755 A1* | 4/2002 | Kumar et al. ................. | 705/26 |

OTHER PUBLICATIONS

Shopping for property Malay Mail. Kuala Lumpur: Jun. 22, 2001. p. 06.*

* cited by examiner

*Primary Examiner*—Frantzy Poinvil
*Assistant Examiner*—Clement Graham
(74) *Attorney, Agent, or Firm*—Anthony V S England; William Steinberg

(57) ABSTRACT

The present invention comprises a business offering to provide computer services and a system to provide a selection of those services. The offering comprises any combination of hosting computer application programs, providing e-business capabilities and providing integration facilities. The services are provided substantially simultaneously to a plurality of parties. In specific embodiments of the present invention, the computer application program is an Enterprise Resource Planning (ERP) system (such as the SAP™ ERP system). The ebusiness capability provides a means for online business transactions between vendors and other parties and the integration capability enables integration of computer applications. Preferably, integration of an ERP system with an ebusiness capability is provided as an eERP solution. However, vendors are able to select various alternative combinations in accordance with their specific needs.

12 Claims, 9 Drawing Sheets

INTEGRATION OF COMPUTER APPLICATIONS AND E-BUSINESS CAPABILITY

FIELD OF THE INVENTION

The present invention relates generally to the provision of computer services and more specifically to the integration of computer application programs and e-business capabilities.

BACKGROUND

As enterprises the world over continually seek to comply with legislated requirements (e.g. taxation laws) and current business practices (e.g. Internet-based e-business capability), the advantages of integration with supplier's systems to improve Supply Chain Management (SCM) represents just one challenge faced in a competitive environment.

ERP systems are accounting-oriented information systems for identifying and planning the resources necessary to process customer orders. ERP systems typically differ from MRPII system in technical requirements such as graphical user interface, relational database, use of 4GL language, and computer assisted software engineering tools and development, client/server architecture and open system portability. ERP systems support a method for effective planning and control of an enterprise's resources necessary to accept, process, ship and account for customer orders in a manufacturing, distribution or service company. ERP is considered to be an integral part of Supply Chain Management (SCM) and often serves as the transaction backbone for other Supply Chain applications. Many ERP solution providers are adding other Supply Chain functions such as Advanced Planning and Scheduling to their application suites. SCM extend the method to reach trading partners, transportation and logistics suppliers, and other supporting functions.

Larger enterprises normally have the resources to adopt to the changing environment, mainly by implementing Enterprise Resource Planning (ERP) packages such as SAP™, BAAN™ and PeopleSoft™. However, smaller enterprises frequently do not have the resources to implement a dedicated world-class system to achieve a competitive advantage or to simply stay in business.

Application Service Providers (ASP's) deploy, host, manage and rent access to applications over the Internet from a centrally managed facility. However, ASP's typically concentrate on providing one or more individual applications, rather than integration of multiple applications. Furthermore, ASP's offer only a very limited degree of integration with client's existing systems.

e-commerce can be defined as buying and selling over digital media. e-business, in addition to encompassing e-commerce, includes both front- and back-office applications that form the engine for modem business. e-business is about redefining old business models, with the aid of technology, to maximise customer value. e-business involves the convergence of Internet and information technologies, thus allowing more effective and efficient communications both internally and externally for companies and organizations.

In the light of current developments, most specifically the proliferation of the Internet, a need exists to provide a comprehensive platform for a business to become an e-business.

SUMMARY OF THE INVENTION

The gist of the present invention revolves around a business offering to provide computer services. The offering comprises any combination of hosting computer application programs, providing e-business capability and providing integration capability.

According to an aspect of the present invention, a business method is provided for offering computer services to a plurality of vendors, by a service provider. The method comprises offering one or more services, which are supplied to the vendors substantially simultaneously, selected from the group consisting of:

hosting a computer application program;

providing an e-business capability for on-line business transactions between the vendors and other parties; and providing an integration capability for integration of computer applications.

According to another aspect of the present invention, there is provided a system for providing, by a service provider, computer services to a plurality of vendors comprising:

processor means to host a computer application program for a plurality of vendors;

processor means to provide an e-business capability for on-line business transactions between the vendors and other parties; and processor means to provide, to a plurality of vendors substantially simultaneously, an integration capability for integration of computer applications.

The processor means to host a computer application program for a plurality of vendors, the processor means to provide an e-business capability for on-line business transactions between said vendors and other parties, and the processor means to provide, to a plurality of vendors substantially simultaneously, an integration capability for integration of computer applications are configured in accordance with a vendor selection from an offering comprising one or more services selected from the group consisting of:

hosting a computer application program;

providing an e-business capability for on-line business transactions between the vendors and other parties; and providing an integration capability for integration of computer applications.

In specific embodiments of the present invention, the computer application program is an Enterprise Resource Planning (ERP) system (such as the SAP™ ERP system). Preferably, integration of an ERP system with an ebusiness capability is provided as an eERP solution. However, vendors are able to select various alternative combinations in accordance with their specific needs.

DESCRIPTION OF THE DRAWINGS

Features and preferred embodiments of the present invention are hereinafter described with reference to the accompanying drawings in which.

DETAILED DESCRIPTION

The principles of the preferred method and/or system described herein have general applicability to any computer-based application programs and e-business application programs. For ease of explanation, the preferred method and/or system are/is described with reference to an Enterprise Resource Planning (ERP) application and, even more specifically, the SAP™ ERP Application. Similarly, the e-business application program is described with specific reference to the WebSphere™ Commerce Suite. However, it is not intended that the present invention be limited to any of the specifically described application programs.

For purposes of this disclosure, "vendors" are defined as those parties that offer their goods and services for sale on-line, typically over the Internet. Accordingly, "vendors" represent customers of an ASP.

"Customers", on the other hand, are defined as "customers of vendors". Accordingly, "customers" avail themselves of goods and services offered by vendors on-line, typically over the Internet.

A "front-end" is defined as an interface for access to an application program. In this way, an e-business "front-end" provides on-line access, for multiple customers simultaneously, to the goods and/or services offered for sale by vendors, typically over the Internet.

Similarly, a "back-end" is defined as a system or application program that is connected behind a front-end. In the present context, an ERP application program represents a "back-end" to the e-business front-end.

A "workplace server" is defined by SAP™ as the server that collects the user roles from the various application systems and builds the role-based and personalized portal Web page. In addition, a workplace server can be used for centralized user administration.

An "eMarketplace", in this context, is defined as an electronic trading hub that facilitates commercial transactions. To be successful, it is essential that an eMarketplace can interpret messages sent to the eMarketplace by all trading partners and that the eMarketplace is capable of producing messages which can be processed by all trading partners.

General Embodiment of Offering to Vendors by a Service Provider

Figure 1:
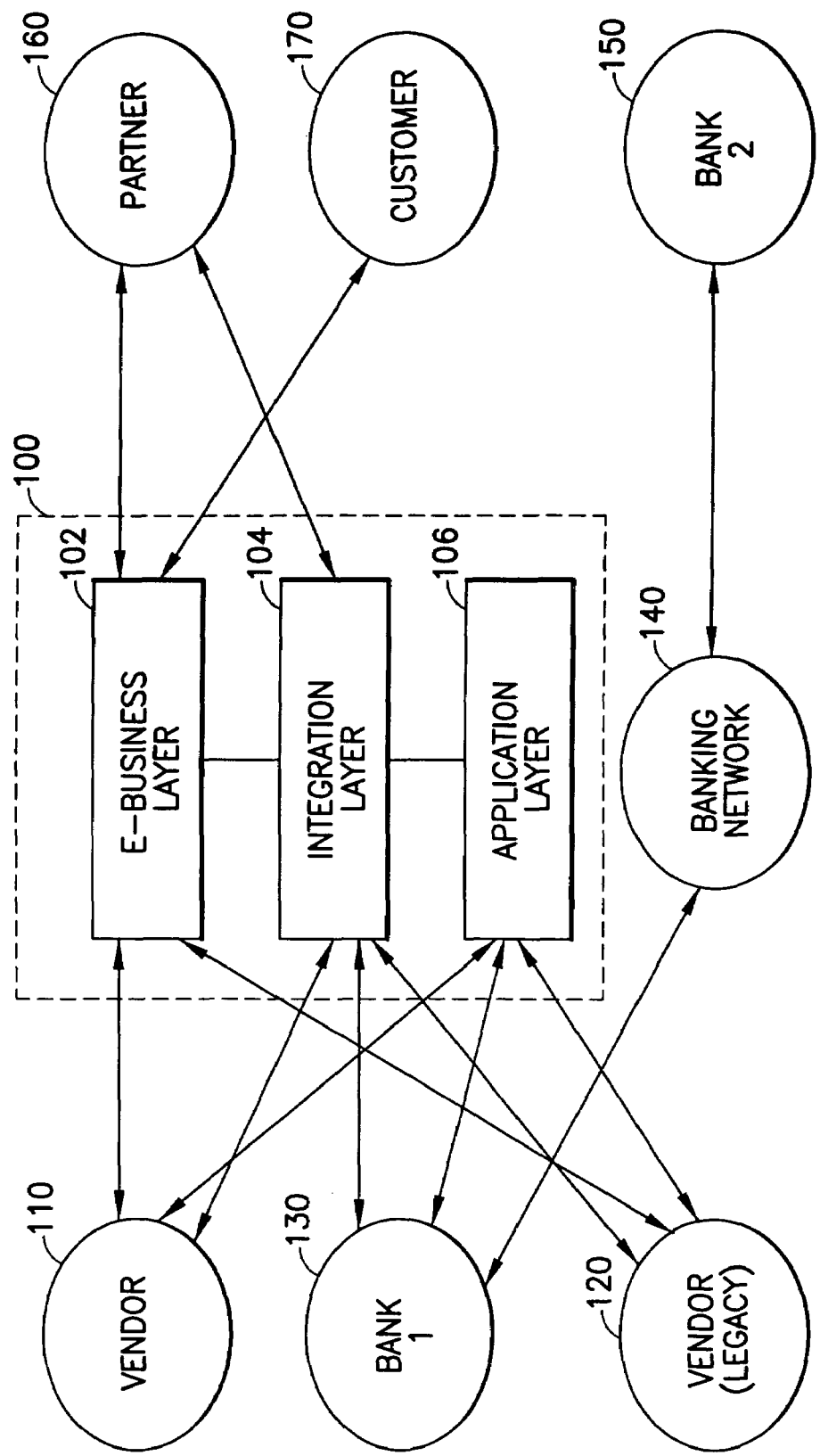
FIG. 1 shows a general framework of a hosting infrastructure that supports integration of a computer application program and an e-business application program.

Referring to FIG. 1, use of a hosting infrastructure 100, that supports integration of a computer application program and an e-business application program, is offered to vendors 110 and 120 by a service provider (not shown). The hosting infrastructure 100 includes an e-business layer 102, an application layer 106 and an integration layer 104. The e-business layer 102 provides a complete framework to conduct e-commerce that attracts customers 170 and drives sales. The e-business layer 102 typically provides a comprehensive set of integrated software components for the building, maintenance and hosting of electronic (on-line) stores and malls so that the vendors 110 and 120 can sell goods and services via the Internet. The e-business layer 102 can be tightly or loosely integrated with an application layer 106, such as an ERP system back-end. Vendors 120 with legacy systems (i.e. non-ERP systems) who use the application hosting component of the offering, transact with their customers 170 through the e-business layer 102 by connection to the hosting infrastructure 100 through an application layer 106. The e-business layer 102 and the application layer 106 are coupled via the integration layer 104.

Vendors 110 already have an ERP system and access the e-business layer 102 and the integration layer 104 via the Internet or a dedicated communications link. Vendors 120 with legacy systems, on the other hand, are using the ERP system of the service provider and access the system 100 via the application layer 106, also via the Internet or a dedicated communications link. Customers 170, of vendors 110 and 120, access the hosting infrastructure 100 through the e-business layer 102 via the Internet. Business partners 160, of the vendors 110 and/or 120, access the e-business layer 102 and/or the integration layer 104, also via the Internet or a dedicated communications link.

In order to process commercial transactions, a bank 130 is accessible through the integration layer 104. The bank 130 is in turn connected to the banking network 140 and may thus transact with other banks 150, being banks of vendors 110 and 120, customers 170, and business partners 160.

Examples of business scenarios that can be provided by the offering include:

1. Application Hosting Only

The service provider hosts a computer software application on behalf of vendors 120, serviced by the application layer 106. For the exemplary case of a hosted ERP Application, each vendor typically has a dedicated production system and access to development and test environments that are shared by multiple vendors. Access to the ERP Application is usually via an Internet website, portal or workplace. Industry segment templates are employed to shorten the implementation lifecycle of the application for each particular vendor.

2. Application Hosting with Integration

In this scenario, a vendor 120 selects integration capability, serviced by the integration layer 104, in conjunction with application hosting. For the exemplary case of a hosted ERP Application, this option enables integration of the ERP Application with an existing legacy application of the vendor 120. Alternatively, integration of the hosted ERP Application and a vendor's own e-business application is possible.

3. e-business Only

The service provider builds, maintains and hosts electronic stores and malls for vendors 110 and/or 120 to sell their goods and services on the Internet. The exact functionality of the e-business capability is determined by vendor requirements and can include a secure e-commerce environment, secure Internet payment methods and support of third party connectivity for Business-to-Business (BSB) transactions. In this instance, vendors 110 and/or 120 provide their own integration facilities, at their end, for integration of e-business services provided by the service provider with their existing computer software application (e.g. legacy or ERP system).

4. e-business with Integration

In this scenario, non-ERP-enabled vendors 120 and/or ERP-enabled vendors 110 can select integration capability, serviced by the integration layer 104, in conjunction with e-business capability, serviced by the e-business layer 102. This option enables integration of e-business capability, provided by the service provider, with existing applications, such as legacy or ERP systems, of the vendors 110 and/or 120.

5. Application Hosting with Integration and e-business (eERP)

In this scenario, vendors 120 select a hosted computer application program, such as an ERP system, integrated with e-business capability. Thus, all three layers 102, 104 and 106 of the hosting infrastructure 100 are employed. Integration of ERP and e-business simplifies the use of ERP systems and makes the systems reusable and more financially attractive to vendors. Numerous vendors and customers of those vendors utilize a common infrastructure to access an ERP system via an e-business front-end interface. The full suite of possible options are available by this EERP offering.

6. Integration Hosting Only

An Integration Hub, represented by integration layer 104, can serve as a standalone offering. In this instance, the integration hub can be used to integrate a computer application program and an e-business application program, both of which are not hosted by the service provider. Additionally, the hub can be used to support more general integration requirements such as distributed vendor applications or connecting of vendors 110 and/or 120 to business partners 160.

7. Hosting Infrastructure

The infrastructure necessary to support the above solutions can also be used to provide a general hosting service. The data centre and system management facilities can be utilized by the service provider and offered to other parties. For instance, an application provided and supported by a partner of the service provider can be hosted on the partner's behalf.

8. Electronic Marketplace (eMarketplace)

Vendors 110 and 120, customers 170 and other business partners 160 can use the eERP solution as a trading eMarketplace to conduct business transactions. The inclusion of the integration layer 104 ensures minimum compliance costs for all parties.

Figure 2:
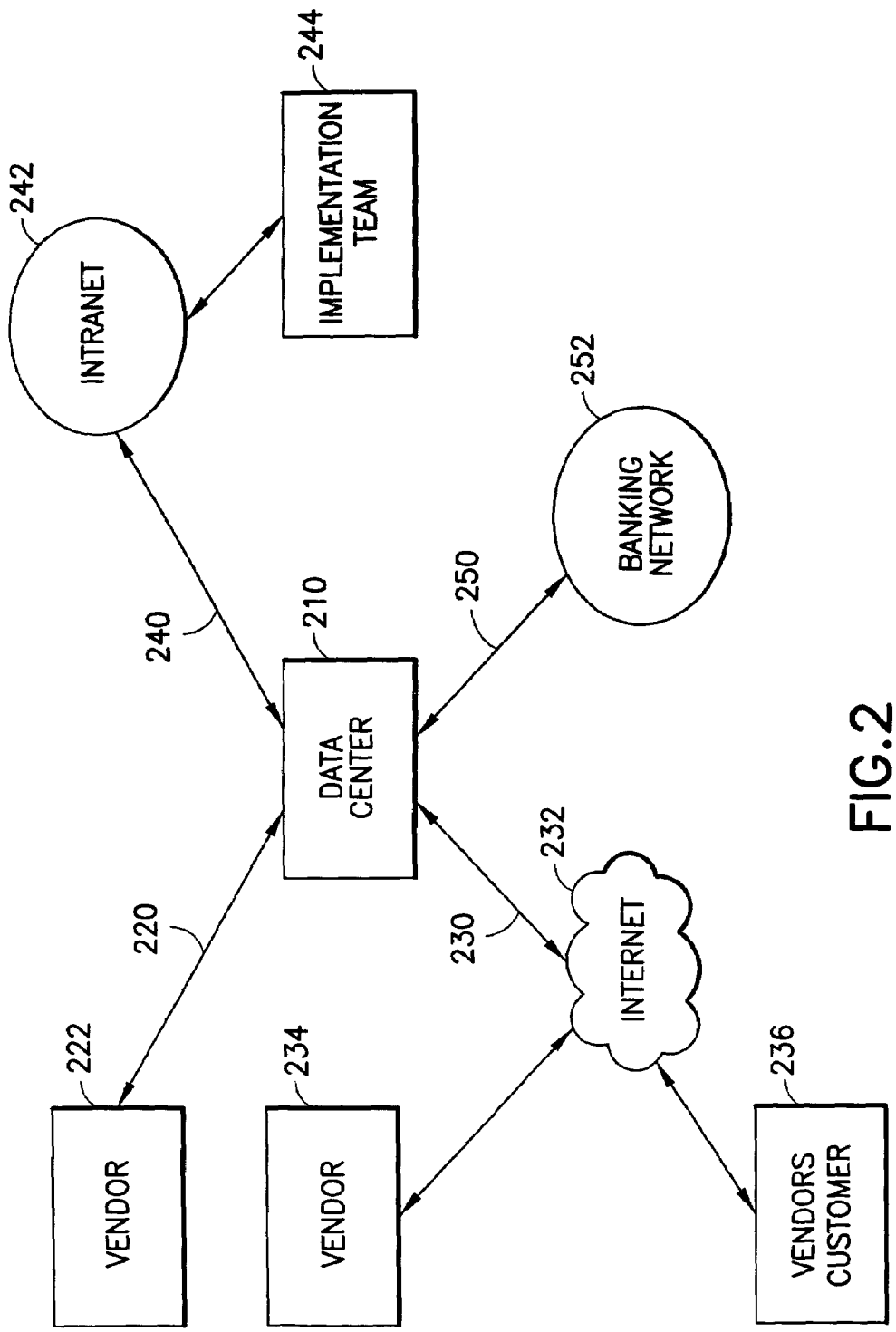
FIG. 2 shows a general framework for hosting computer application programs and providing computer services.

FIG. 2 shows a general framework for hosting computer application programs. The data centre 210 and the implementation team 244 of FIG. 2 implement and maintain the application programs and e-business application programs hosted by the hosting infrastructure 100 of FIG. 1.

A vendor 222 accesses the data centre 210 via a dedicated communications link 220, such as an Integrated Services Digital Network (ISDN) link. Alternatively, a vendor 234 accesses the data centre 210 via the Internet 232. Similarly, a customer 236 of a vendor 222 or ERP customer 234 accesses the data centre 210 via the Internet 232. Vendors 222 and 234 and customers 236 use browser software applications that execute on computer systems such as Personal Computers (PC's) and Personal Digital Assistants (PDA's) to access the data centre 210.

The implementation team 244, responsible for implementation and maintenance of the data centre 210, accesses the data centre 210 via an intranet 242 and a communications link 240.

The data centre 210 is also connected to the banking network 252, via a dedicated communications link 250, for processing transactions between the vendors 222 and 234 and customers 236 of the vendors 222 and 234, electronically.

Figure 3:
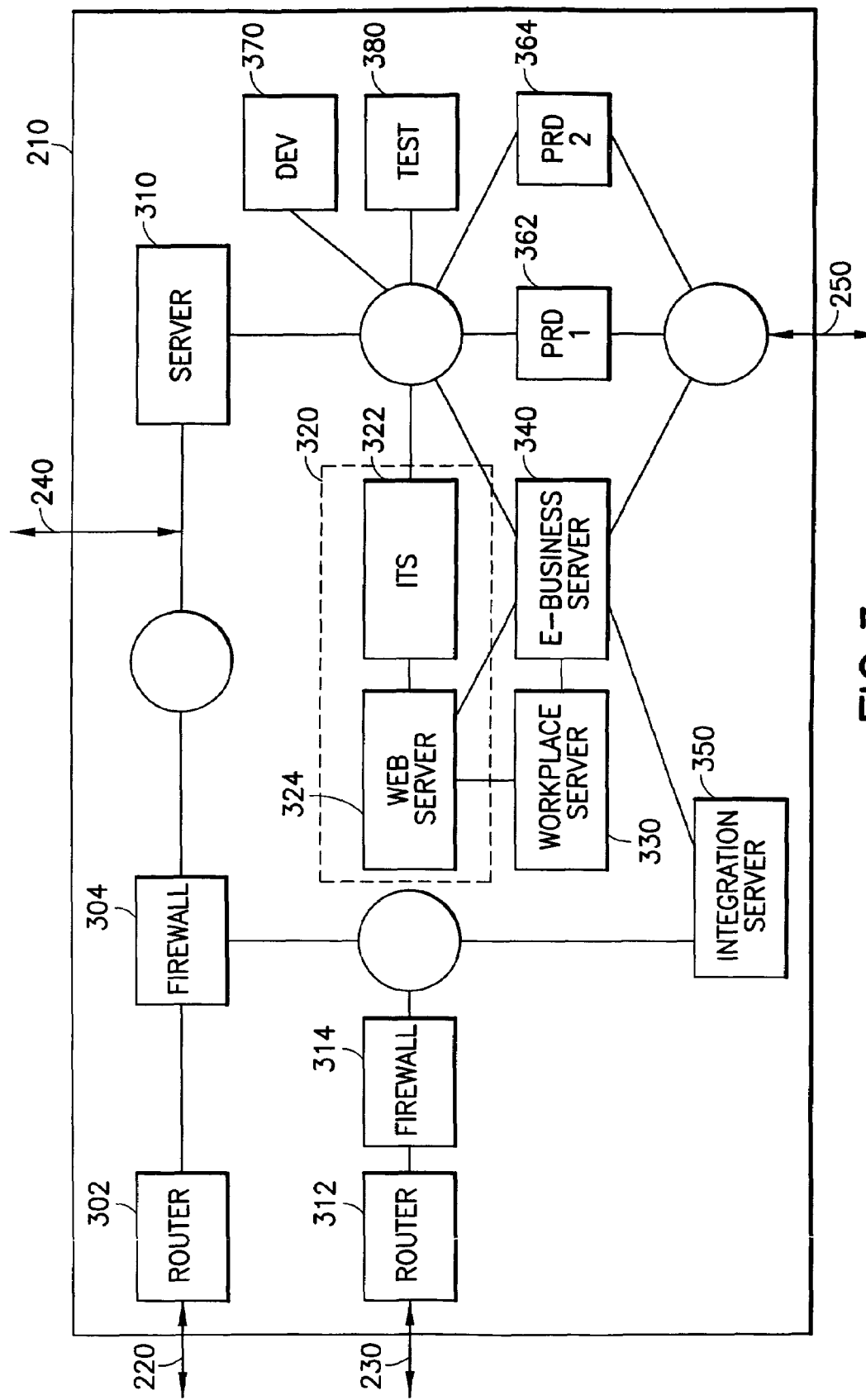
FIG. 3 shows a block diagram of an embodiment of the data centre of FIG. 2.

FIG. 3 shows a detailed block diagram of the data centre 210 of FIG. 2. Direct communications link 220 access to the data centre 210 is via a router 302 and a firewall 304. Internet access 230 to the data centre 210 is via a router 312 and a firewall 314. Traffic is routed via a dedicated ring and thus remains isolated from the intranet 242 of the service provider at all times. A Web Server 324 is connected to an Internet Transaction Server (ITS) 322, a Workplace Server 330, an e-business server 340 and an Integration server 350. The Web Server 324 and the ITS 322 constitute what SAP™ call a middleware component of the mysap.com architecture.

The communications link 240 provides access for the ERP application implementation and maintenance team 244 via an intranet 242 of the service provider. The communications link 240 provides access via the Server 310.

FIGS. 4 to 7 show various transaction process flows occurring in the general framework shown in FIGS. 2 and 3. The numerals accompanying the individual process flows in FIGS. 4 to 7 indicate the sequence of the overall process flow for a particular transaction type.

Application Hosting Process Flow

Figure 4:
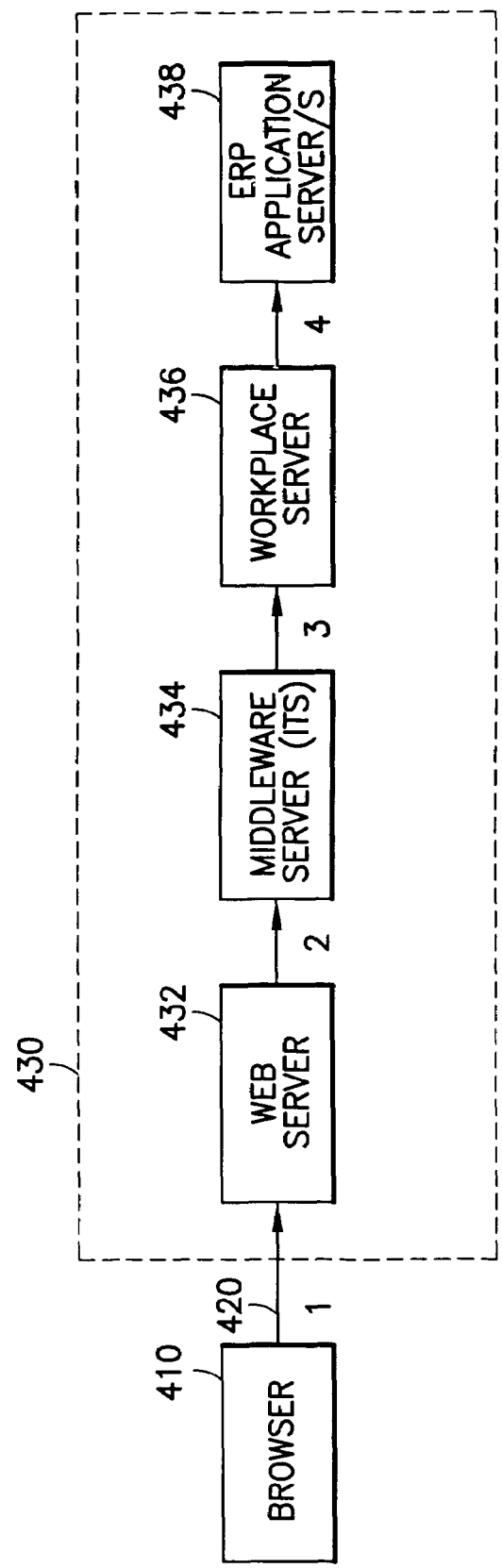
FIG. 4 shows a process flow for application program hosting.

FIG. 4 shows a process flow for application hosting of an ERP system by a service provider.

A browser 410, located at a vendor's site, communicates with a host data centre 430 via the Internet (not shown) or a dedicated link 420, such as an Integrated Services Digital Network (ISDN) link.

Internet communications, at the host data centre 430, are processed by a Web Server 432 that is connected to a Middleware Server 434. The Middleware Server 434 is configured as an Internet Transaction Server (ITS). The ITS is in turn connected to a Workplace Server 436 that provides an operating environment, such as an Internet website, portal or workplace, for access by an ERP customer. The Workplace Server 436 accesses the ERP components hosted on the ERP Application Server/s 438.

B2C e-commerce Transaction Process Flow

Figure 5:
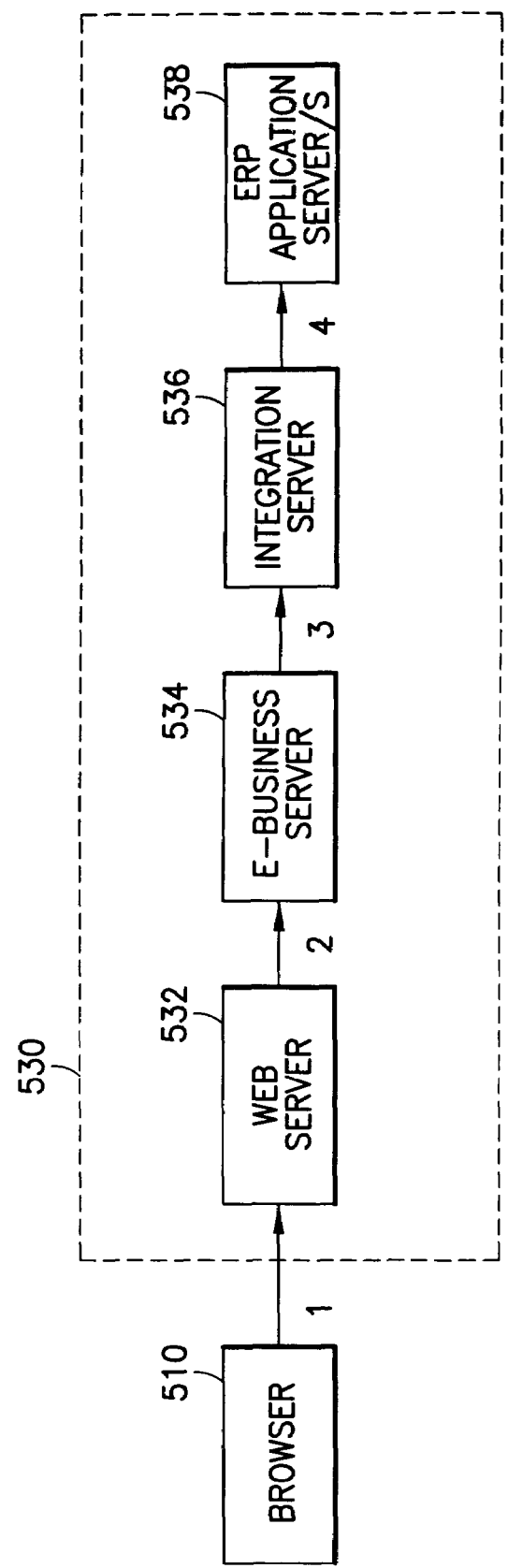
FIG. 5 shows a process flow for Business-to-Customer (B2C) e-commerce transactions.

FIG. 5 shows a process flow for e-commerce transactions between a business and a customer (B2C). The ERP application program is hosted at a data centre 530, by a service provider, on behalf of a vendor.

A browser 510, of a customer, communicates with the host data centre 530 via the Internet (not shown).

Internet communications, at the host data centre 530, are processed by a Web Server 532 that is connected to an e-business Server 534. The e-business Server 534 is configured as an online marketplace, using software such as IBM's WebSphere™ Commerce Suite. The e-business Server 534 is in turn connected to a Integration Server 536, such as a MQ Series Server, that integrates the marketplace and the ERP components hosted on the ERP Application Server/s 538.

B2B e-commerce Transaction Process Flow—Procurement via the Internet

Figure 6:
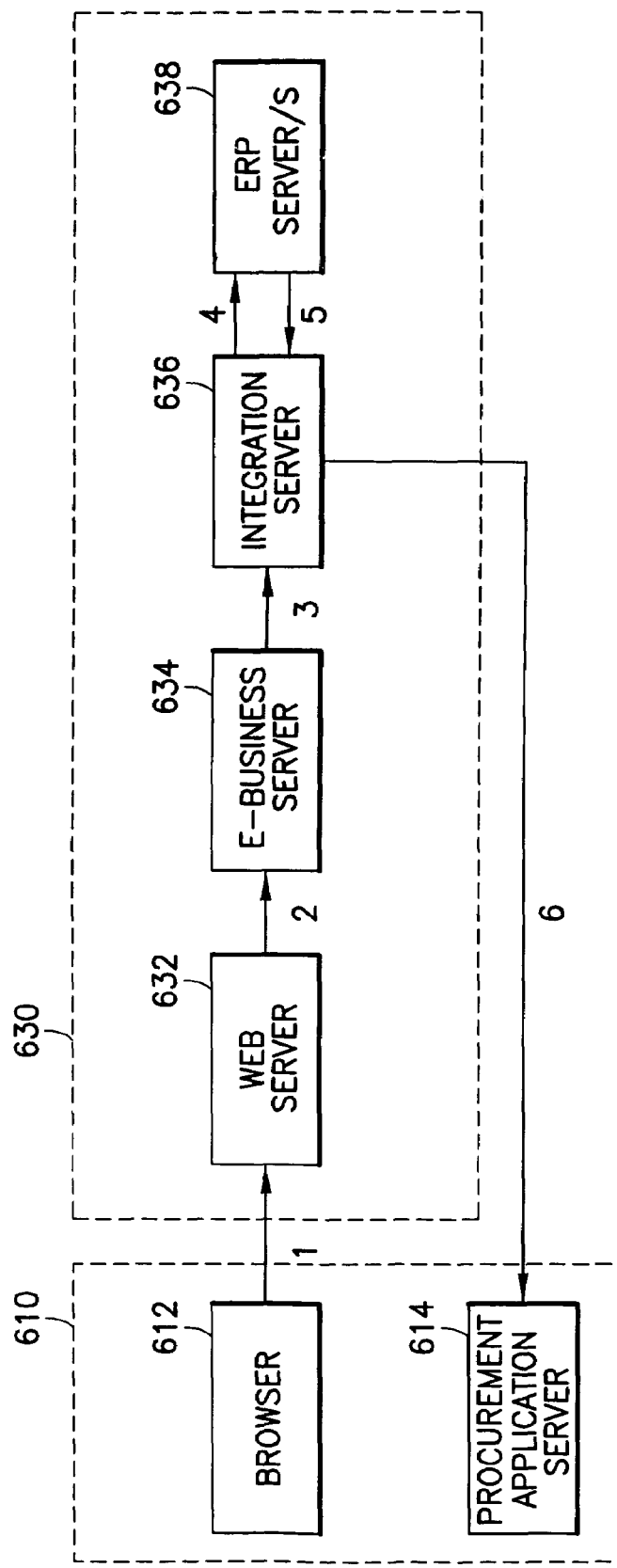
FIG. 6 shows a process flow for Business-to-Business (B2B) procurement by means of a browser.

FIG. 6 shows a process flow for e-commerce transactions between businesses (B2B). Specifically, the transactions involve procurement from a vendor, by a customer of the vendor, via the Internet.

A browser 610, of a customer, communicates with a host data centre 630 via the Internet (not shown).

Internet communications, at the host data centre 630, are processed by a Web Server 632 that is connected to an e-business Server 634. The e-business Server 634 is configured as an online marketplace, using software such as IBM's WebSphere™ Commerce Suite. The e-business Server 634 is in turn connected to an Integration Server 636, such as a MQ Series Server, that integrates the marketplace and the ERP components hosted on the ERP Application Server/s 638. The Integration Server 636 also integrates the ERP components with a Procurement Application Server 614, at the site of the customer. The Integration Server 636 is connected to the Procurement Application Server 614 via the Internet (not shown).

Figure 7:
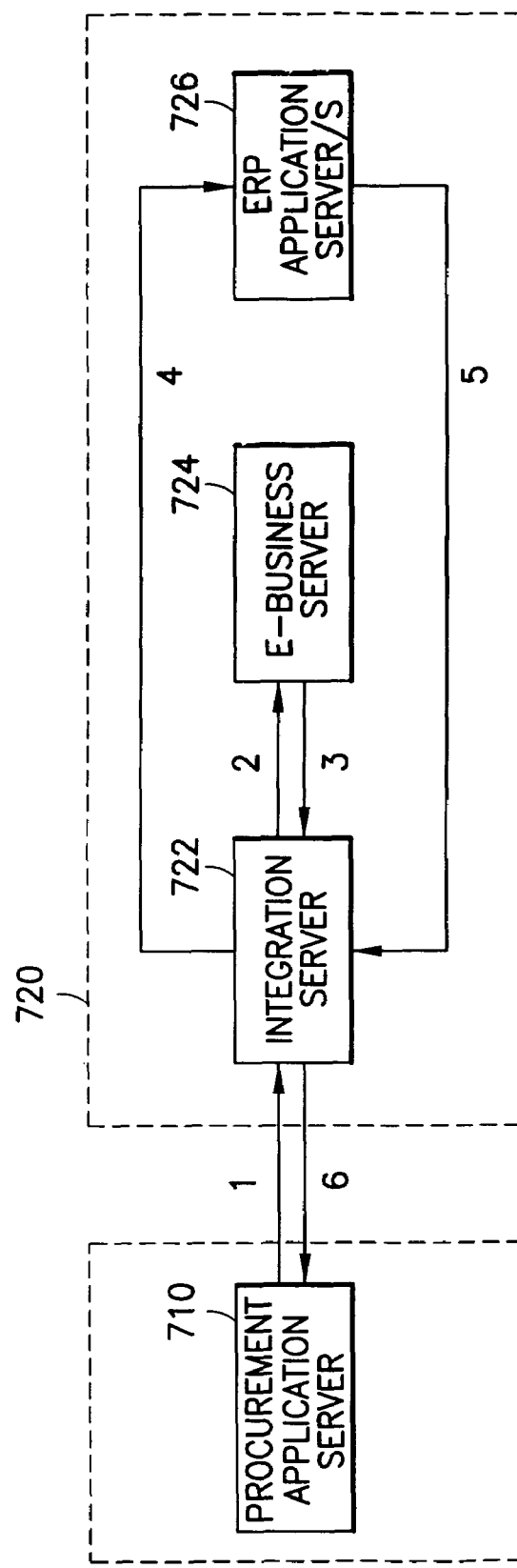
FIG. 7 shows a process flow for Business-to-Business (B2B) procurement directly from a vendor's system.

B2B e-commerce Transaction Process Flow—Procurement directly from ERP Customer's Backend System FIG. 7 shows a process flow for e-commerce transactions between businesses (B2B). Specifically, the transactions involve procurement from a vendor, by a customer of the vendor, directly from the customer's back-end system. The back-end system may be a legacy system (i.e. different to the ERP application provided by the service provider).

The customer's Procurement Application Server 710 is connected to an Integration Server 722, such as a MQ Series Server, at a data centre 720, via the Internet. The Integration Server 722 is connected to an e-business Server 724, which is configured as an online marketplace, using software such as IBM's WebSpherer™ Commerce Suite. The Integration Server 722 is also connected to the ERP Application Server/s 726. In this configuration, the e-business Server 724 is not directly connected to the ERP Application Server/s 726 and must thus communicate with the ERP Application Server/s 726 via the Integration Server 722. The Integration Server 722 is connected to the customer's Procurement Application Server 710 via the Internet (not shown).

eERP Embodiment

Referring to the previously described eERP business scenario 5 and FIG. 1, a vendor 120 places a catalogue of the products on to a web site, which is hosted at the e-business layer 102 level. Catalogues are built using material master records stored in the application layer 106 and are fully synchronised. A customer 170 can browse those catalogues and purchase items from the catalogues. A purchasing transaction is passed to the service provider bank 130 via the integration layer 104. If the service provider's bank 130 is different from a customer bank 150, a debit transaction is passed to the customer bank 150 via the banking network 140. The transaction is also recorded in the ERP system at the application layer 106. A confirmation message is sent to the customer 170 if there are sufficient inventory levels and the payment transaction was successful. If transportation of the purchased good is required, a freight company business partner 160 of the vendor 120 is notified. Communications between the vendor 120, their house bank 130 and their business partner 160 occur with the facilitation of MQ Series messaging and communication software.

Figure 9:
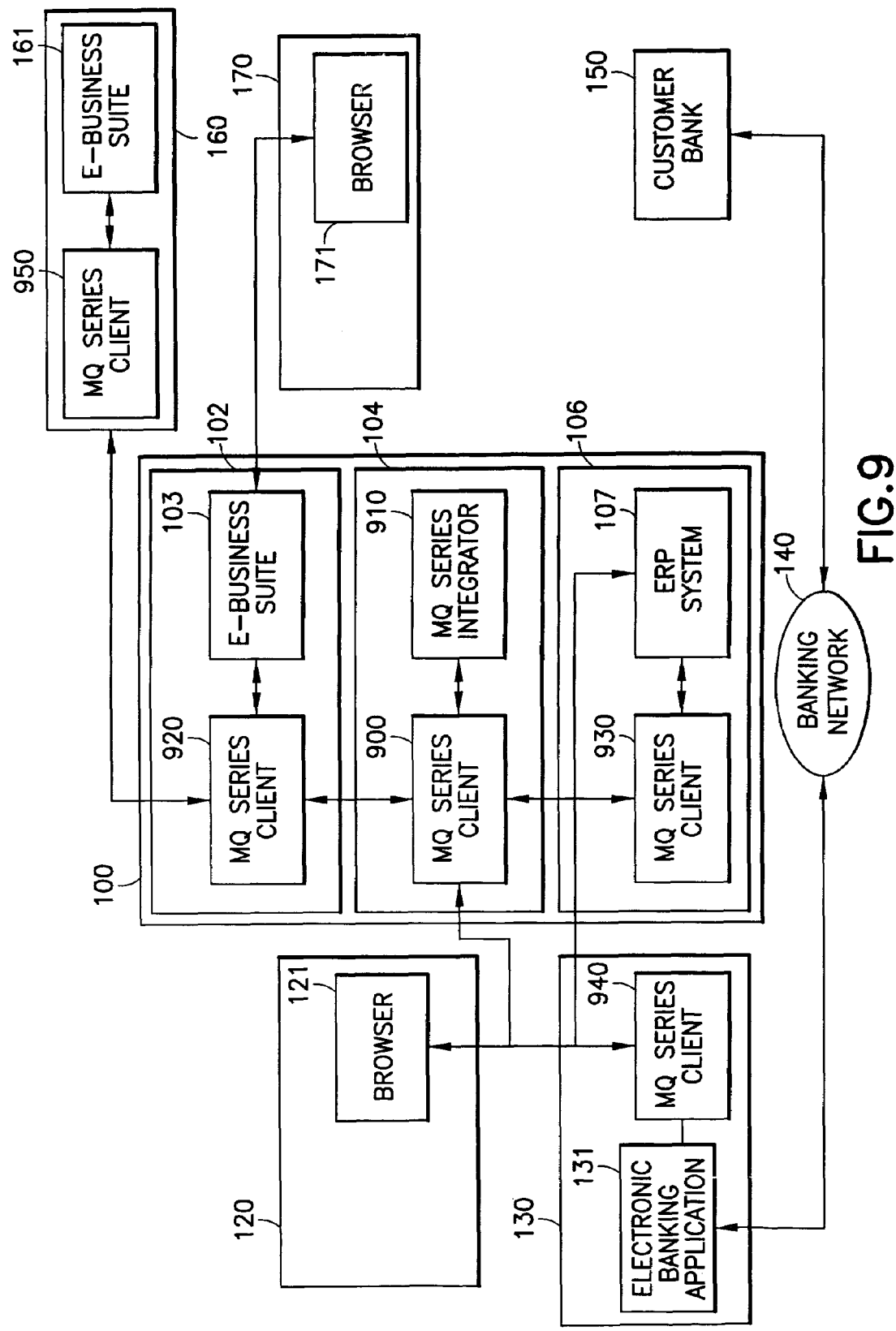
FIG. 9 shows the framework of FIG. 1 in additional detail.

FIG. 9 shows the framework of FIG. 1 with additional detail and is now used to describe a transaction process, as a sequence of steps, in this eERP embodiment:

1. Sales catalogues are published in the e-business suite 103. The catalogues can be synchronised with a vendor material master of an ERP system. The synchronisation occurs using the Integration Hub (refer to the diagram below). A vendor 120 can control the catalogue publishing process using a standard web browser 121.

2. Customers 170 browse the vendor's site using a standard web-enabled browser 171 and can choose to purchase one or more items from the catalogue.

3. Once a purchase transaction is recorded in the e-business suite 103, a sales order document is generated and passed on to the MQ Series Client 920.

4. The MQ Series Client 920 passes on the message to a message queue in the MQ Series Server 900, which forms part of the integration layer 104. The message is then processed by the MQ Series Integrator 910, which maps the received file to the sales order format of the ERP System 107.

5. Once the sales order file in the ERP system format has been generated and passed back to the MQ Series server 900, the sales order file is placed in a message queue of the MQ Series Server 900 for transfer to the application layer 106.

6. The MQ Series Client 184, setup in the application layer 106 passes the message to the ERP system 109 where a sales order is recorded and a confirmation message is generated.

7. The confirmation message is sent back to customer's browser 171 using the same route, but in the reverse direction.

8. If payment details were collected (applicable to B2C transactions and some B2B transactions), payment instructions are sent to the vendors' house bank 130. Alternatively, payment instructions can be processed using payment processing functionality built into the e-business suite 103 (WebSphere™ Commerce Suite for example).

The MQ Series integration solution is a publicly available product for integration of various application programs and software suites. In simplified terms, MQ Series translates information between applications and requires some implementation at the integration layer 104, the application layers 102 and 106 and other parties connected to the eERP system. Specific MQ Series 'connectors' are commonly available for translation of information into formats necessary for specific applications (e.g. SAP™). The MQ Series Integrator 910 incorporates an MQ Series Integrator Library that is specific to an application (e.g. SAP™).

Notwithstanding, alternative integration solutions are available. Custom solutions and connectors can be employed, however, off-the-shelf solutions incorporating relevant libraries and connectors (such as MQ Series) are generally more cost effective.

mySAP.com Application Hosting

Figure 8:
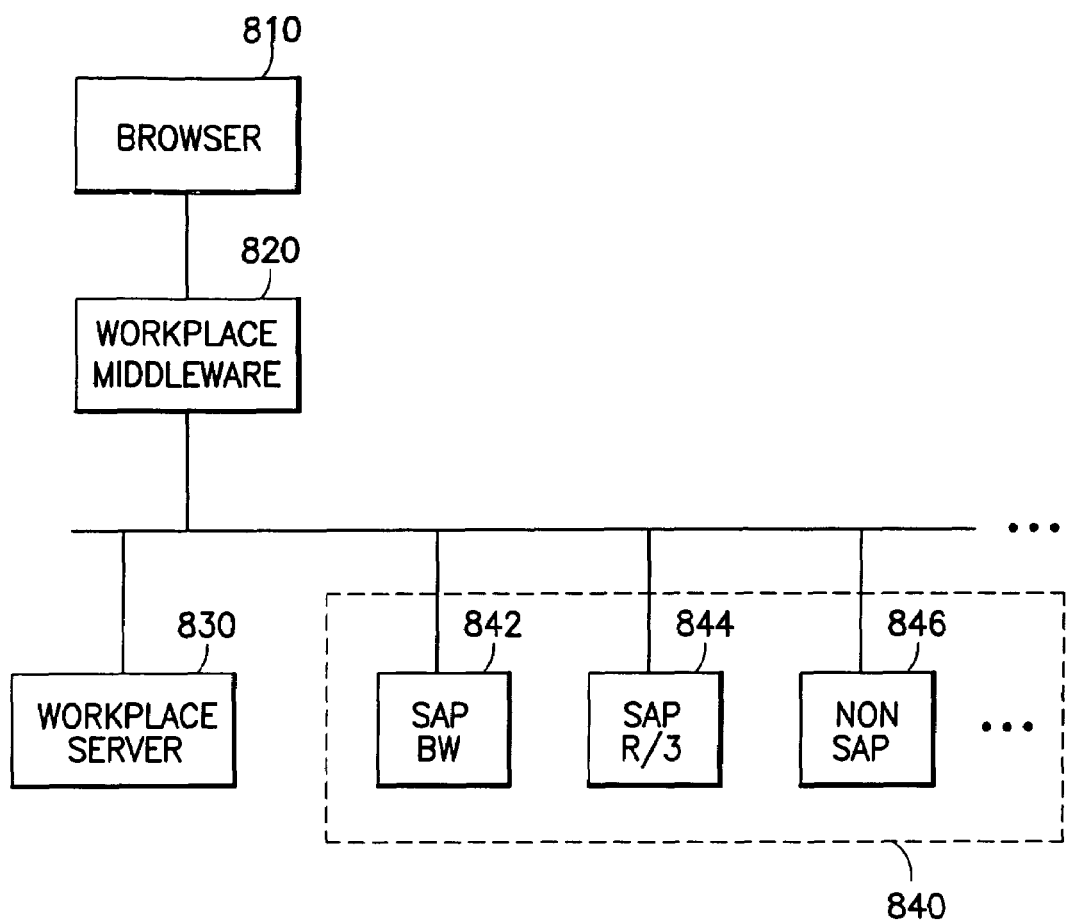
FIG. 8 shows a block diagram of a specific embodiment of an integrated ERP and e-business system, being an overview of the mysap.com architecture.

FIG. 8 shows a block diagram of a specific embodiment of an integrated ERP and e-business system. The ERP system used is SAP™ R/3 and the integrated system is accessible through the mySAP Workplace enterprise portal (mySAP.com), on the Internet.

The SAP system consists of three components (not shown) namely Development (DEV), Test (TST), and Production (PRD). Additional components may be added as necessary. The DEV and TST components are shared by multiple vendors. The PRD component can either be provided on a shared basis or a dedicated vendor basis.

A user (e.g. a customer of a service provider) accesses the SAP™ system real time by means of a browser 810, connected to Workplace Middleware 820. The Workplace Middleware 820 consists of a Web Server and an Internet Transaction Server (ITS). The ITS consists of two components—Web GATE (WGATE) and Application GATE (AGATE). AGATE is the main component of the SAP™ ITS and is responsible for session management including the mapping of R/3 screens or function modules to Hypertext Markup Language (HTML), Web session time-out handling, R/3 connection management and the generation of HTML documents. The WGATE component encapsulates the various Hypertext Transfer Protocol (HTTP) server interfaces such as Common Gateway Interface (CGI), Netscape™ Server Applications Programming Interface (NSAPI) and Internet Server Applications Programming Interface (ISAPI), transparently. The WGATE component passes the requested data to the AGATE component, and receives the HTML pages from the AGATE component. The separation of AGATE and WGATE components minimises the security risk by only having the necessary code on the HTTP server which is relevant to the SAP™ Internet Transaction Server function for the Web server.

The Workplace Server 830 collects the user roles from the component systems and builds a role-based and personalised portal Web page. In addition, this information can be used for centralised user administration. The Workplace Server 830 is usually a relatively small system with moderate system loading, because the actual business functions are carried out in the component systems 840 without any participation of the Workplace Server 830. SAP™ have a number of different component systems apart from R/3 (844). Other systems include Business Warehouse (BW) 842, Automated Planning and Optimiser (APO), CRM, BBP (SAP's B2B app), etc. The database of the Workplace Server is small, because it holds no actual business data. The Workplace Server 830 enables actual SAP™ transactions to be executed via a web browser 810.

Two different implementation approaches can be taken with respect to the physical location of the Workplace Middleware 820 and the Workplace Server 830. In the centralised approach, the Workplace Middleware 820 and the Workplace Server 830 are located at the service provider's site, while in the distributed approach, either one or both of the Workplace Middleware 810 and Workplace Server 830 are located at the customer's site.

Customers of the vendor using the integrated e-business and ERP (e ERP) capabilities can utilise the provided e-business capability. The e-business component consists of IBM's WebSphere™ Commerce Suite, tightly integrated with the SAP™ back-end. Customers connect to the WebSphere™ Server via the Internet. Multiple customers may thus utilize this server and the associated configuration, simultaneously.

Vendors can be connected to the hosting data centre either via a dedicated line (direct connection to the data centre) or via the Internet. A dedicated connection can be serviced by either a frame relay or an ISDN link. In either case a router, which supports both ISDN and frame relay connections (such as CISCO 2503) is necessary at the vendor's site. Vendors can also access their ERP system via the Internet, providing sufficient Internet connection bandwidth is available. If the available bandwidth is insufficient, or the customer does not have a permanent Internet connection, sufficient bandwidth can be obtained by connecting to an Internet Service Provider (ISP) using ISDN, satellite or Digital Subscriber Line (DSL) methods.

In order to access the system the incoming network traffic will have to pass through one of two firewall configurations. If the traffic is coming from a dedicated line, it is routed via a Secure Network Interface (SNI) firewall. A dedicated port is setup for vendors wishing to access their system via a dedicated link. Vendors connecting via the Internet require an additional firewall before the traffic can be routed to their ERP system.

The foregoing describes only a few arrangements and/or embodiments of the present invention, and modifications and/or changes can be made thereto without departing from the scope and spirit of the invention, the arrangements and/or embodiments being illustrative and not restrictive.

I claim:

1. A method for offering hosting services, comprising the steps of:

a) hosting a plurality of applications on a host computer system at a data center, wherein hosting the applications includes:

executing an first shopping application for a first shopping process on the data center host computer system, the first shopping process being accessible to shoppers by Internet communications wherein the first shopping process performs the step of:

a first hosting service step, the first hosting service step including:

communicating with a first integration process and a first resource planning process via Internet communications to transact first sales, wherein the first resource planning process is a process of a first resource planning application on a host computer system located remotely from the data center and the first integration process is a process of a first integration application on a host computer system located remotely from the data center;

executing an application for a second resource planning process on the data center host computer system, wherein the second resource planning process performs the step of:

a second hosting service step, the second hosting service step including:

communicating with a production process via Internet or dedicated link communications, wherein the production process is a process of a production application on a host computer located remotely from the data center;

and executing an application for a second integration process on the data center host computer system, wherein the second integration process performs the steps of:

a third hosting service step, the third hosting service step including:

coupling communications between the first shopping process and the second resource planning process to transact second sales;

a fourth hosting service step, the fourth hosting service step including:

coupling communications between the second resource planning process and a second shopping process, wherein the second shopping process is a process of a second shopping application accessible to shoppers by Internet communications on a host computer located remotely from the data center, the communications between the second resource planning process and the second shopping process being Internet communications to transact third sales;

a fifth hosting service step, the fifth hosting service step including:

coupling communications between the first shopping process and a third resource planning process to transact fourth sales, wherein the third resource planning process is a process of a third resource planning application on a host computer located remotely from the data center;

and a sixth hosting service step, the sixth hosting service step including:

coupling communications between a certain process and a third shopping process, wherein the third shopping process is a process of a third shopping application accessible to shoppers by Internet communications on a host computer located remotely from the data center and the certain process is a process of a certain application on a host computer located remotely from the data center;

and b) performing a hosting service by the host computer system responsive to one of the customers selecting from among the first, second third, fourth, fifth and sixth hosting service steps, and wherein sales are transacted with shoppers for the customers responsive to ones of the selected hosting service steps being performed on the host computer system.

2. The method of claim 1, wherein said second resource planning process comprises a process of an Enterprise Resource Planning (ERP) application.

3. The method of claim 2, wherein said second resource planning process comprises a process of an SAP™ ERP application.

4. The method of claim 1, wherein said first shopping process comprises a process of a WebSphere™ Commerce Suite of applications.

5. The method of claim 1, including the step of:
executing an application for a banking transaction process on the data center host computer system.

6. The method of claim 1, wherein said second integration process comprises a process of an MQ Series™ of applications.

7. A hosting system comprising:
a host computer system at a data center hosting a plurality of applications, the applications including:
a first shopping application stored on the host computer system and operating as a first shopping process when executed on the host computer system, the first shopping process being accessible to shoppers by Internet communications, wherein the executing first shopping process performs a first hosting service step, wherein the first hosting service step includes:
communicating with a first integration process and a first resource planning process via Internet communications to transact first sales, wherein the first resource planning process is a process of a first resource planning application on a host computer system located remotely from the data center and the first integration process is a process of a first integration application on a host computer system located remotely from the data center;
a second application stored on the host computer system and operating as a second resource planning process when executed on the host computer system, wherein the executing second resource planning process performs a second hosting service step, wherein the second hosting service step includes:
communicating with a production process via Internet or dedicated link communications, wherein the production process is a process of a production application on a host computer located remotely from the data center;
and
a third application stored on the host computer system and operating as a second integration process when executed on the host computer system, wherein the executing second integration process performs a number of hosting service steps including:
a third hosting service step including:
coupling communications between the first shopping process and the second resource planning process to transact second sales;
a fourth hosting service step including:
coupling communications between the second resource planning process and a second shopping process, wherein the second shopping process is a process of a second shopping application accessible to shoppers by Internet communications on a host computer located remotely from the data center, the communications between the second resource planning process and the second shopping process being Internet communications to transact third sales;
a fifth hosting service step including:
coupling communications between the first shopping process and a third resource planning process to transact fourth sales, wherein the third resource planning process is a process of a third resource planning application on a host computer located remotely from the data center;
and
a sixth hosting service step including:
coupling communications between a certain process and a third shopping process, wherein the third shopping process is a process of a third shopping application accessible to shoppers by Internet communications on a host computer located remotely from the data center and the certain process is a process of a certain application on a host computer located remotely from the data center;
wherein the host computer system performs a hosting service responsive to one of the customers selecting from among the first, second third, fourth, fifth and sixth hosting service steps, and wherein sales are transacted with shoppers for the customers responsive to ones of the hosting service steps being performed on the host computer system.

8. The system of claim 7, wherein said second resource planning process comprises a process of an Enterprise Resource Planning (ERP) application.

9. The system of claim 8, wherein said second resource planning process comprises a process of an SAP™ ERP application.

10. The system of claim 7, wherein said first shopping process comprises a process of an WebSphere™ Commerce Suite of applications.

11. The system of claim 7, including:
an application stored on the host computer system and operating as banking transaction process when executed on the host computer system.

12. The system of claim 7, wherein said second integration process comprises a process of an MQ series™ of applications.

* * * * *